United States Patent
An et al.

(10) Patent No.: US 11,118,294 B2
(45) Date of Patent: Sep. 14, 2021

(54) LAUNDRY TREATMENT MACHINE

(71) Applicant: LG ELECTRONICS INC., Seoul (KR)

(72) Inventors: Junhee An, Seoul (KR); Hyojeong Kang, Seoul (KR); Hosung Jang, Seoul (KR); Minseung Jung, Seoul (KR)

(*) Notice: Subject to any disclaimer, the term of this patent is extended or adjusted under 35 U.S.C. 154(b) by 152 days.

(21) Appl. No.: 16/242,192

(22) Filed: Jan. 8, 2019

(65) Prior Publication Data

US 2019/0211489 A1   Jul. 11, 2019

(30) Foreign Application Priority Data

Jan. 8, 2018   (KR) .................. 10-2018-0002472

(51) Int. Cl.
  *G06F 3/16*  (2006.01)
  *H04R 1/04*  (2006.01)
  (Continued)

(52) U.S. Cl.
  CPC .............. *D06F 33/00* (2013.01); *D06F 37/28* (2013.01); *D06F 39/14* (2013.01); *G06F 3/167* (2013.01); *H04R 1/025* (2013.01); *H04R 1/04* (2013.01); *D06F 34/28* (2020.02); *D06F 58/20* (2013.01); *D06F 2202/12* (2013.01); *D06F 2210/00* (2013.01); *D06F 2212/02* (2013.01); *H04R 1/023* (2013.01); *H04R 1/086* (2013.01)

(58) Field of Classification Search
  CPC ............ D06F 34/28; H04R 1/04; G06F 3/167
  See application file for complete search history.

(56) References Cited

U.S. PATENT DOCUMENTS

| 4,520,576 A | 6/1985 | Vander Molen |
| 9,260,298 B1 * | 2/2016 | Liao .................... H04R 31/00 |

(Continued)

FOREIGN PATENT DOCUMENTS

| CN | 201232123 Y | 5/2009 |
| CN | 101622884 A | 1/2010 |

(Continued)

OTHER PUBLICATIONS

CN106149319A Machine Translation (Year: 2016).*

(Continued)

*Primary Examiner* — Spencer E. Bell
(74) *Attorney, Agent, or Firm* — KED & Associates LLP

(57) ABSTRACT

A laundry treatment machine includes: a cabinet which forms an outer shape and has an input port through which laundry is input; a tub which is disposed inside the cabinet and stores washing water; a drum which is rotatably disposed inside the tub; a microphone assembly in which a plurality of microphones for speech recognition are spaced apart; a door which opens and closes the input port, and has an inner front surface, on which the microphone assembly is disposed, to which the microphone assembly is closely attached, that comprises a microphone hole, which communicates with the outside, formed in each portion where the plurality of microphones are disposed, so that it is possible to eliminate a space where the sound leakage occurs between the microphone assembly and the door.

17 Claims, 17 Drawing Sheets

(51) Int. Cl.
   *D06F 39/14*   (2006.01)
   *D06F 37/28*   (2006.01)
   *H04R 1/08*    (2006.01)
   *D06F 58/20*   (2006.01)
   *D06F 34/28*   (2020.01)
   *D06F 33/00*   (2020.01)
   *H04R 1/02*    (2006.01)

(56) References Cited

U.S. PATENT DOCUMENTS

| | | | |
|---|---|---|---|
| 2008/0202844 A1 | 8/2008 | Leclear et al. | |
| 2011/0131735 A1* | 6/2011 | Park | A47L 15/4212 8/137 |
| 2016/0215430 A1 | 7/2016 | Ha et al. | |
| 2016/0258104 A1* | 9/2016 | James | G06F 3/16 |
| 2019/0145041 A1* | 5/2019 | Bhandare | D06F 39/14 68/196 |
| 2019/0164552 A1* | 5/2019 | Lim | G01S 5/22 |

FOREIGN PATENT DOCUMENTS

| | | | |
|---|---|---|---|
| CN | 203475161 U | | 3/2014 |
| CN | 105594221 A | | 5/2016 |
| CN | 106149319 A | * | 11/2016 |
| CN | 206219845 U | | 6/2017 |
| DE | 3503141 | | 1/1985 |
| EP | 2 031 121 | | 3/2009 |
| EP | 2 644 765 | | 10/2013 |
| JP | 2009-056215 | | 3/2009 |
| JP | 2014-054405 | | 3/2014 |
| KR | 10-2014-0095779 | | 8/2014 |
| KR | 10-2015-0006264 | | 1/2015 |
| KR | 10-2018-0001024 | | 1/2018 |
| WO | WO 2015/055239 | | 4/2015 |

OTHER PUBLICATIONS

European Search Report dated Apr. 25, 2019 issued in Application 19150707.8

International Search Report dated May 7, 2019 issued in Application PCT/ KR2019 / 000252.

Chinese Office Action dated Sep. 18, 2020 issued in Application 201910015261.3 and English translation.

* cited by examiner

LAUNDRY TREATMENT MACHINE

CROSS-REFERENCE TO RELATED APPLICATION

This application claims priority under 35 U.S.C. § 119 to Korean Application No. 10-2018-0002472 filed on Jan. 8, 2018, whose entire disclosure is hereby incorporated by reference.

BACKGROUND

1. Field

The present invention relates to a laundry treatment machine, and more particularly, to a laundry treatment machine in which a microphone assembly for recognizing voice is mounted in a door.

2. Background

As the interactive smart home era begins in earnest, development of home appliances that provides an interactive service through a speech recognition-based artificial intelligence platform is required.

In order to provide such an interactive service, a home appliance having a microphone assembly for recognizing voice and a speaker for transmitting sound must be provided.

Even in a laundry treatment machine that performs cleaning through washing, rinsing, spin-dry, and the like so that contamination can be removed from clothes, bedding, and the like by using water, detergent, and mechanical action, the microphone assembly and the speaker may be installed to provide such an interactive service.

The microphone assembly and the speaker may be disposed in the front side near a user or in a door. In the case of a front load washing machine in which an input port is formed in the front side and a door for opening and closing the input port is disposed in the front side, a microphone assembly and a speaker may be disposed inside a door disposed in the front side.

However, in the case of a door having a forward convex shape, when a flat type microphone assembly is mounted in the inside, since a sound leakage space from which a sound is leaked is formed between the front surface of the door and the microphone assembly, there is a problem that the user's voice is not transmitted to the microphone.

In addition, when a sound generated from the speaker disposed inside the door is transmitted to the outside of the door, if the sound generated from the speaker is dispersed in various directions in the inside of the door, there is a problem that the sound cannot be transmitted accurately to the user.

BRIEF DESCRIPTION OF THE DRAWINGS

The embodiments will be described in detail with reference to the following drawings in which like reference numerals refer to like elements wherein.

DETAILED DESCRIPTION

Figure 1:
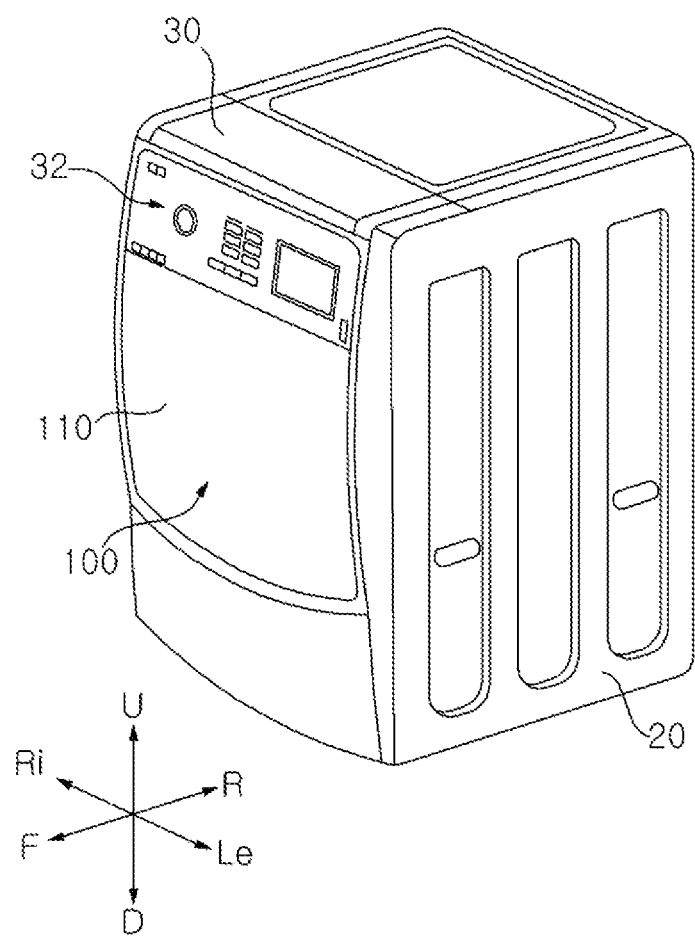
FIG. 1 is a perspective view of a laundry treatment machine according to an embodiment of the present invention.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

The below expression indicating a direction, such as "front(F)/rear(R)/left(Le)/right(Ri)/up(U)/down(D)", is defined as shown in the drawing, but this is just for the purpose of clarifying the present invention, and it is obvious that the directions may be defined differently depending on where the reference is placed.

Hereinafter, the present invention will be described with reference to the drawings for explaining a laundry treatment machine according to embodiments of the present invention.

Configuration of Laundry Treatment Machine

Figure 2:
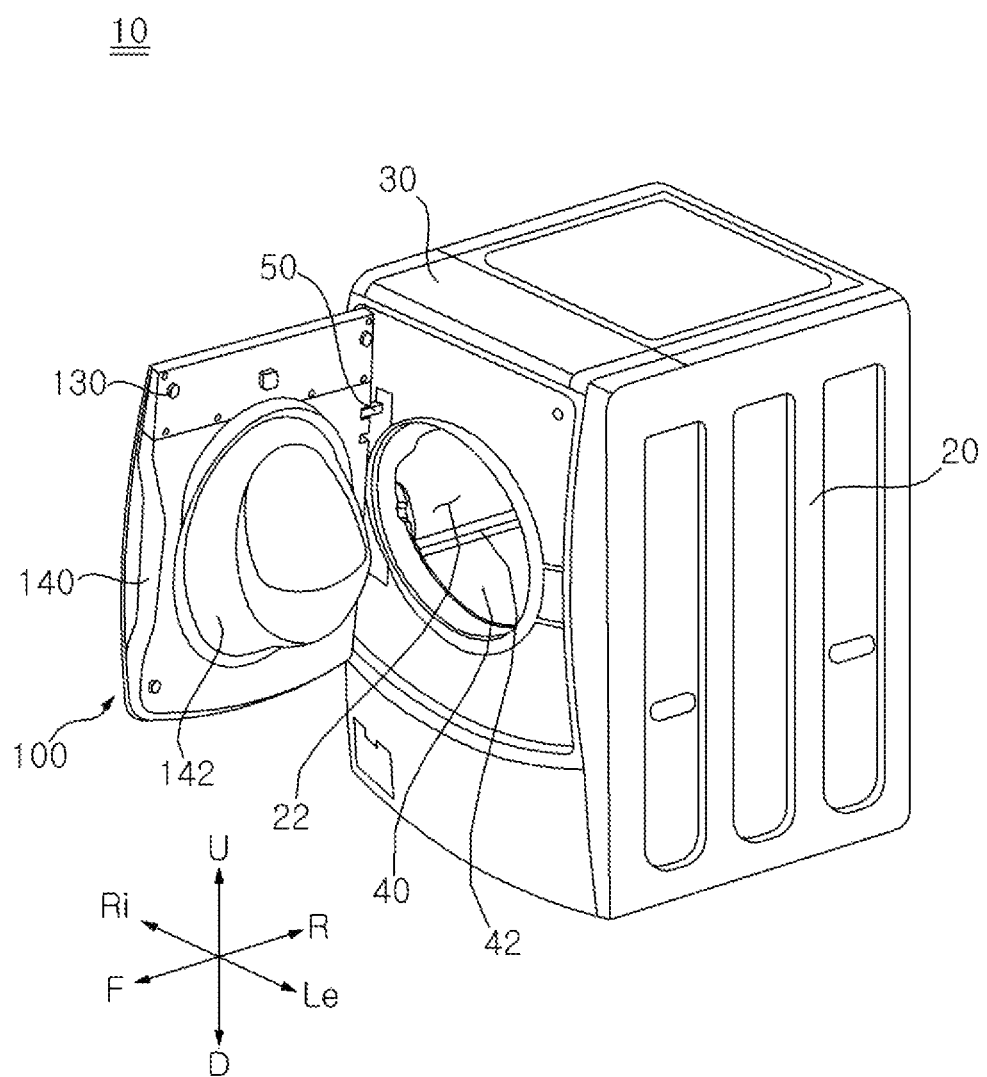
FIG. 2 is a perspective view of an opened door of a laundry treatment machine according to an embodiment of the present invention.

FIG. 1 is a perspective view of a laundry treatment machine according to an embodiment of the present invention. FIG. 2 is a perspective view of an opened door of a laundry treatment machine according to an embodiment of the present invention.

Referring to FIG. 1, a laundry treatment machine 10 according to an embodiment of the present invention includes a cabinet 20 which forms an outer shape and is provided with an input port, formed in the front F, through which laundry is input, a door 100 which opens and closes the input port through which the laundry is input into the cabinet 20, a tub (not shown) which is disposed inside the cabinet and receives washing water, a drum 40 which is rotatably disposed inside the tub, and a driving unit (not shown) which applies torque to the drum to rotate. The laundry treatment machine 10 according to the present embodiment may further include a detergent input unit 30 to which the detergent is input, and a control panel 32 which receives a user input and displays a laundry treatment machine state.

The cabinet 20 is provided with an input port 22 so that laundry can be taken in and out. The door 100 is rotatably connected to the cabinet 20 so that the input port 22 can be opened and closed. The door 100 according to the present embodiment is fixed to the cabinet 20 through a hinge part 50. The door 100 of the laundry treatment machine 10 according to the present embodiment may be provided with a control panel 32. The control panel 32 may be provided in the cabinet 20, unlike the present embodiment.

The tub forms a space for accommodating the washing water. The tub 40 is disposed outside the drum 40 while surrounding the drum 40. A tub hole is formed on the front surface of the tub, and the tub hole is formed to communicate with the input port 22 of the cabinet 20 so that laundry can be input into the drum 40.

The driving unit may be disposed in the rear side (R) of the tub and generate a rotational force. The driving unit may be connected to a rotating shaft (not shown) and rotate the drum 40. The driving unit may rotate the drum 40 at various speeds or directions. The driving unit includes a stator (not shown) having a coil wound thereon and a rotor (not shown) rotated by generate an electromagnetic interaction with the coil.

The drum 40 receives the laundry and rotates. The drum 40 is disposed inside the tub. The drum 40 is formed into a rotatable cylindrical shape. The drum 40 is provided with a plurality of through holes to allow the washing water to pass through. The drum 40 receives the rotational force of the driving unit and rotates.

A drum hole is formed on the front side F of the drum 40. The drum hole is formed to communicate with the input port 22 and the tub hole so that the laundry can be taken in and out of the drum 40. A ball balancer (not shown) for reducing the vibration due to the rotation of the drum 40 may be coupled to the rim of the front side F and rear side R of the drum 40. The ball balancer may include a filling fluid therein along with a ball.

The laundry treatment machine according to the present embodiment may further include a gasket 24 that seals a space between the tub and the cabinet 20. The gasket 24 may be disposed between an opening of the tub and the input port 22. The gasket 24 relieves the impact transmitted to the door 100 when the drum 40 rotates and prevents the washing water in the tub from leaking to the outside.

The cabinet 20 may include a water supply module (not shown) for supplying washing water from an external water source into the tub, and a drain module (not shown) for discharging the washing water in the tub to the outside.

The control panel 32 may include an input unit (not shown) for inputting various operation commands such as selection of a washing course, operation time and reservation for each process through a user, and a display unit (not shown) for displaying the operation state of the laundry treatment machine 10. The control panel 32 according to the present embodiment is disposed in the door 100. That is, the input unit and the display unit may be formed in a front cover 110 of the door 100, and the control panel 32 for controlling the input unit and the display unit may be disposed in the rear side (R) of the front cover 110.

Configuration of Door

Figure 3:
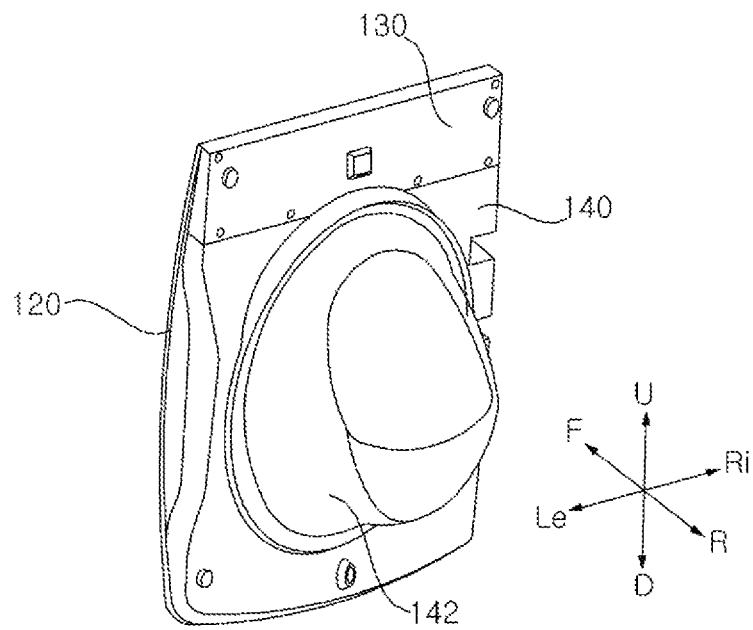
FIG. 3 is a rear perspective view of a door according to an embodiment of the present invention.
Figure 4:
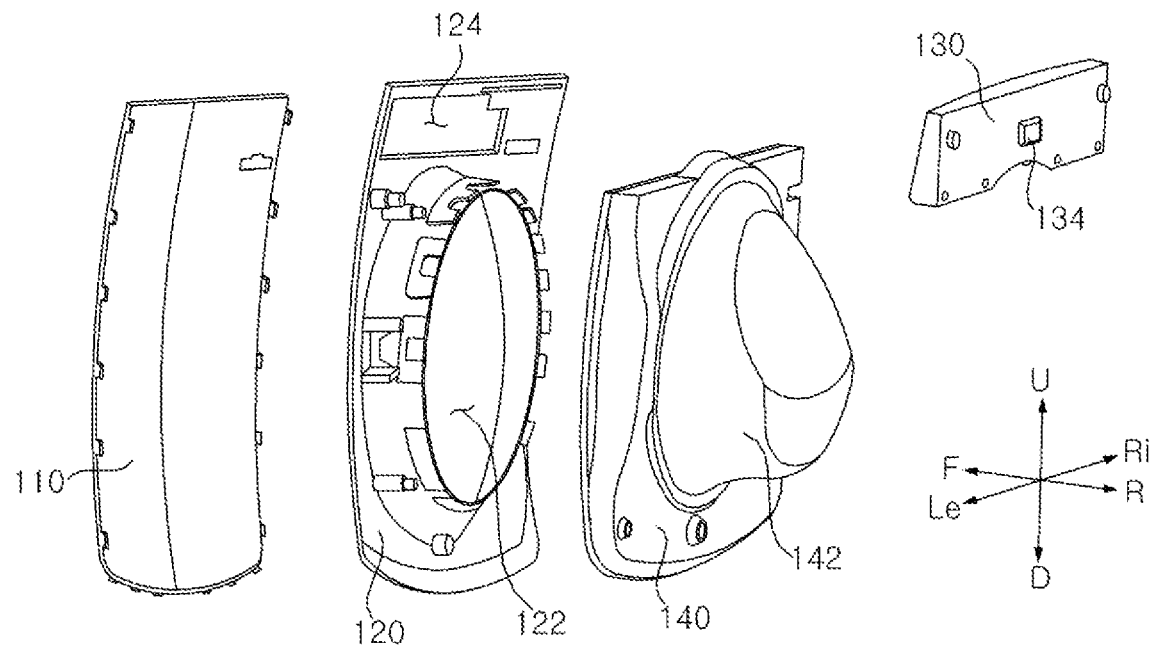
FIG. 4 is an exploded perspective view of a door according to an embodiment of the present invention.

FIG. 3 is a rear perspective view of a door according to an embodiment of the present invention. FIG. 4 is an exploded perspective view of a door according to an embodiment of the present invention.

Figure 5:
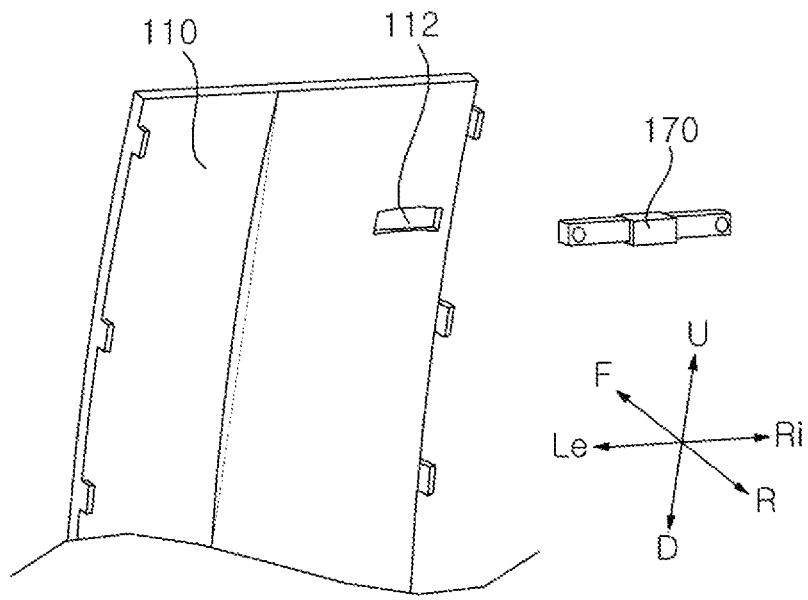
FIG. 5 is a view showing the relationship between a microphone assembly and a front cover of door according to an embodiment of the present invention.
Figure 6A:
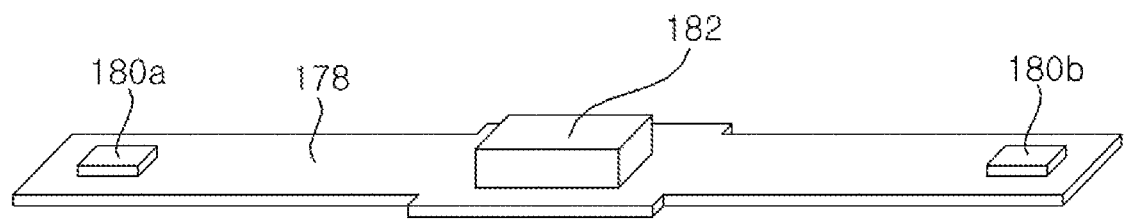
FIG. 6A and FIG. 6B are a top perspective view and a bottom perspective view of a microphone assembly according to an embodiment of the present invention.
Figure 6B:
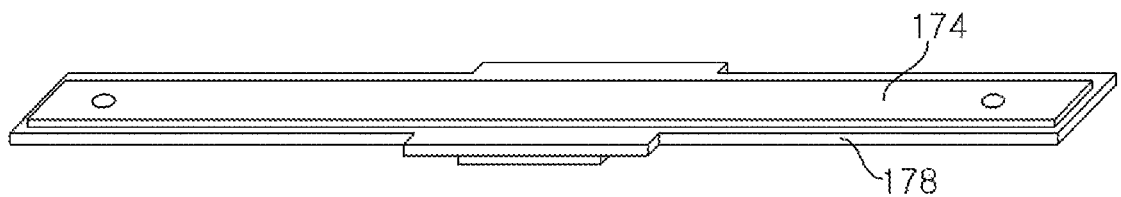
Figure 7A:
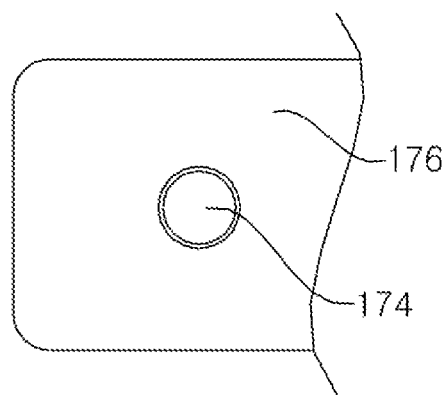
FIG. 7A is a view showing a part of an adhesive member and a water-repellent member according to an embodiment of the present invention.
Figure 7B:
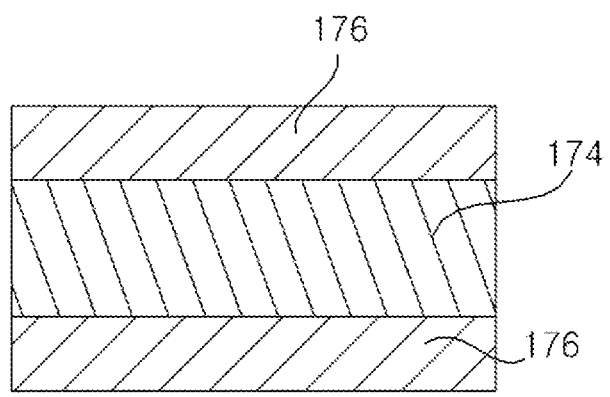
FIG. 7B is a cross-sectional view of an adhesive member and a water-repellent member according to an embodiment of the present invention.
Figure 8:
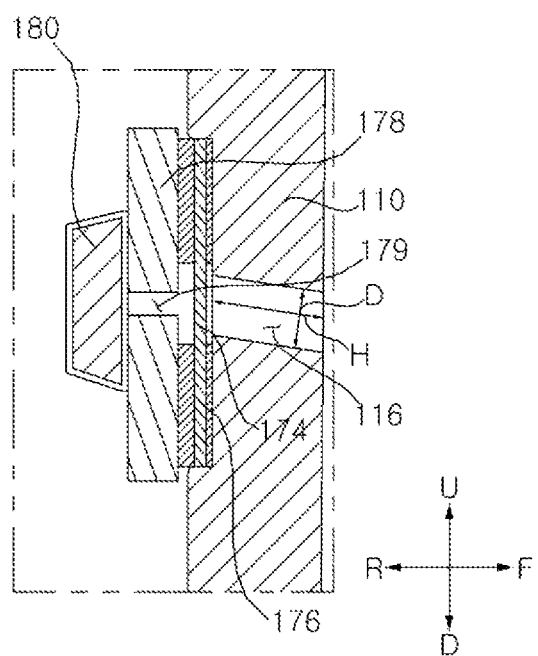
FIG. 8 is a cross-sectional view illustrating a state in which a microphone assembly is mounted in a front cover according to an embodiment of the present invention.
Figure 9A:
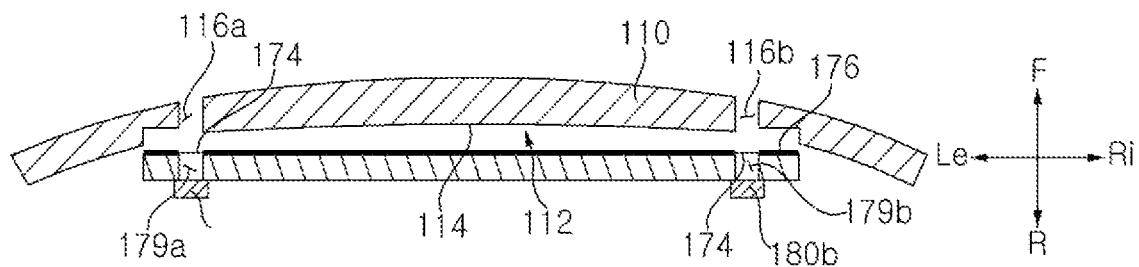
FIG. 9A is a view showing a state before a microphone assembly is closely attached to a front cover according to an embodiment of the present invention.
Figure 9B:
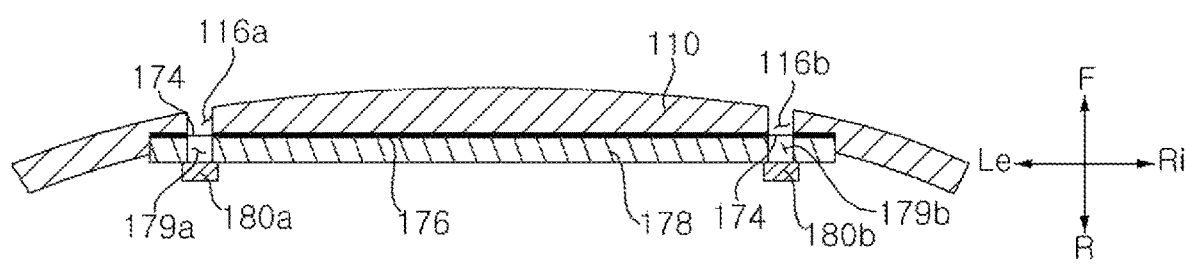
FIG. 9B is a view illustrating a state in which a microphone assembly is closely attached to a front cover according to an embodiment of the present invention.

FIG. 5 is a view showing the relationship between a microphone assembly and a front cover of door according to an embodiment of the present invention. FIG. 6A and FIG. 6B are a view of a microphone assembly according to an embodiment of the present invention. FIG. 7A and FIG. 7B are a view showing an adhesive member and a water-repellent member according to an embodiment of the present invention. FIG. 8 is a cross-sectional view illustrating a state in which a microphone assembly is mounted in a front cover according to an embodiment of the present invention. FIG. 9A and FIG. 9B are a view for explaining a structure in which a microphone assembly is closely attached to a front cover according to an embodiment of the present invention.

Figure 10:
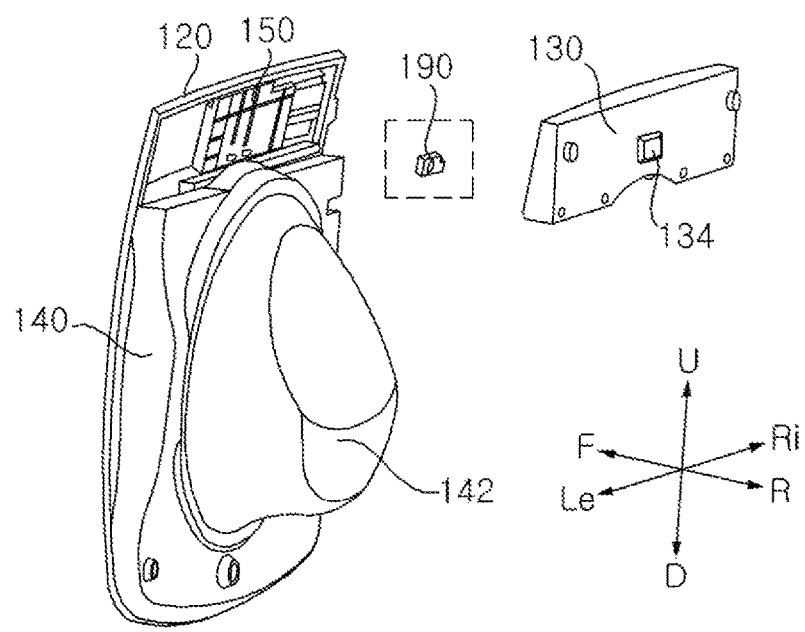
FIG. 10 is an exploded view for explaining a structure in which a speaker is disposed inside a door according to an embodiment of the present invention.
Figure 11:
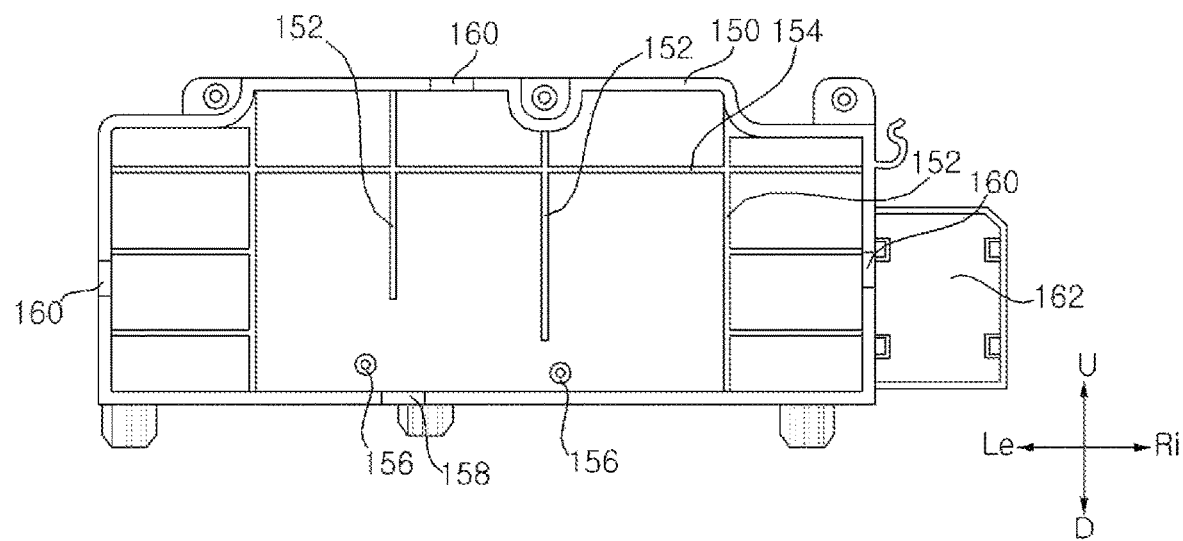
FIG. 11 is a front view of a speaker mounting member according to an embodiment of the present invention.
Figure 12:
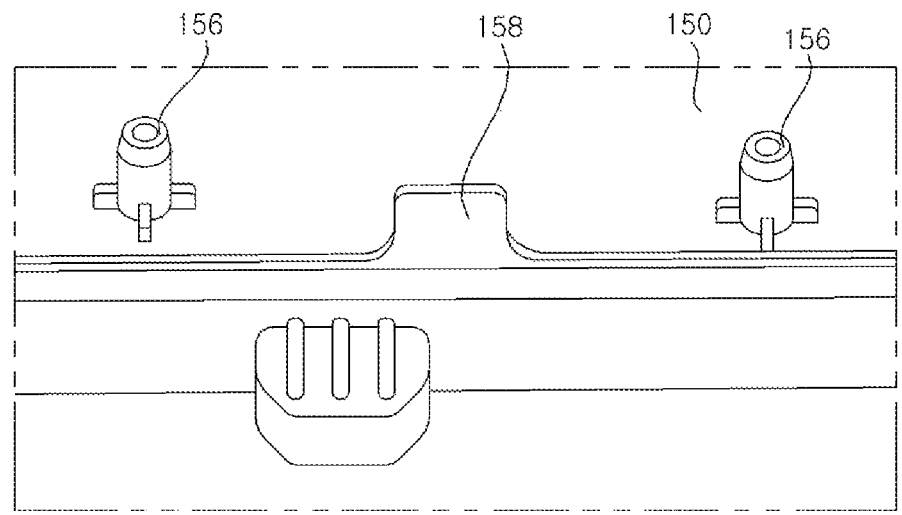
FIG. 12 is an enlarged perspective view of a portion where the speaker of FIG. 11 is mounted.
Figure 13:
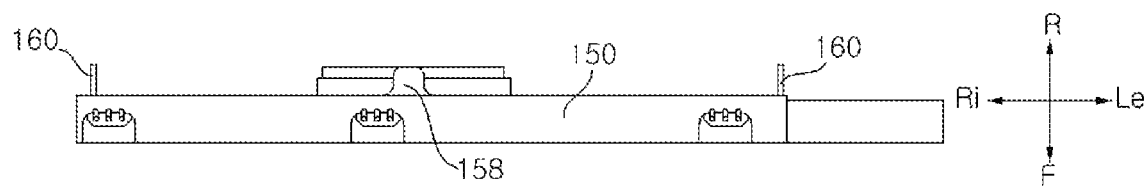
FIG. 13 is a bottom view of FIG. 11.
Figure 14:
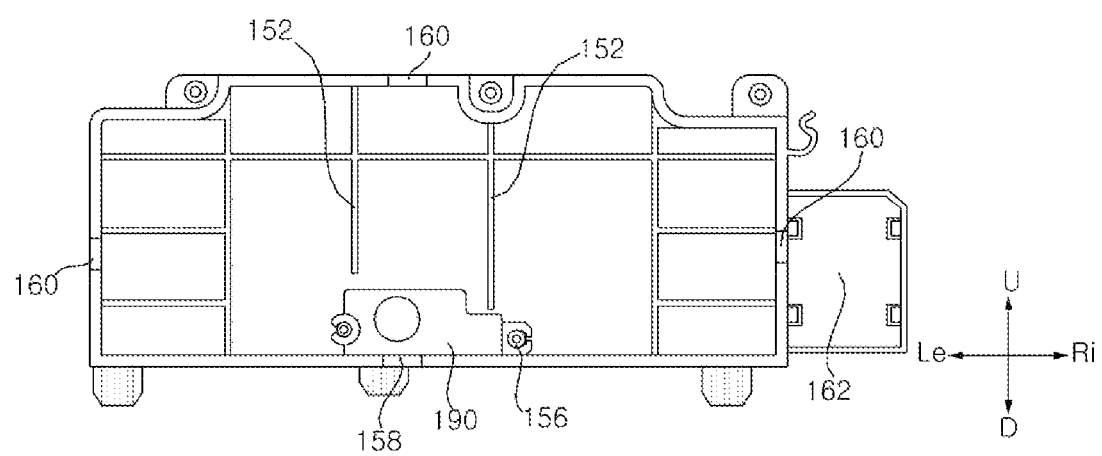
FIG. 14 is a view showing a state in which a speaker is mounted in FIG. 11.
Figure 15:
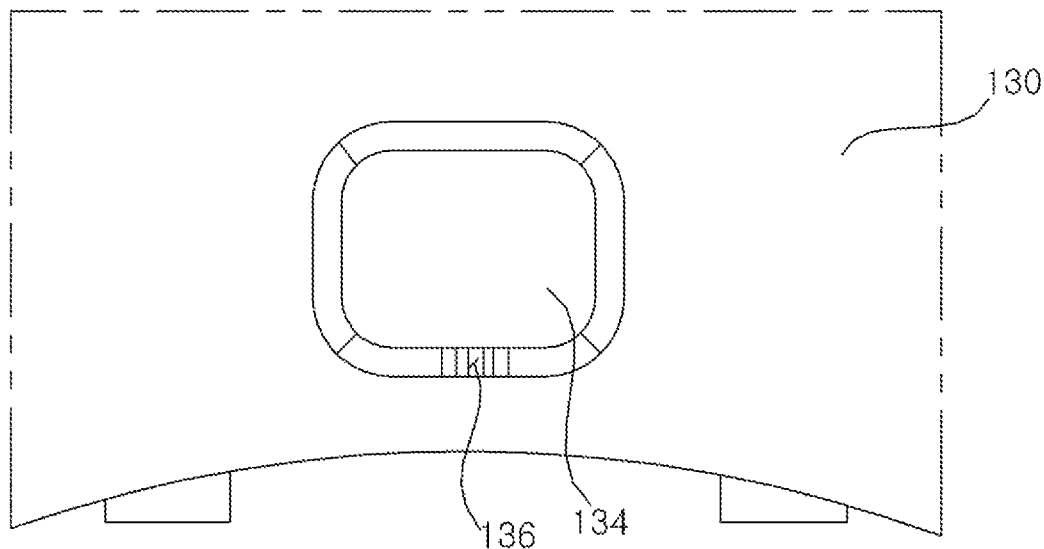
FIG. 15 is a view for explaining a speaker groove part of a rear cover according to an embodiment of the present invention.
Figure 16:
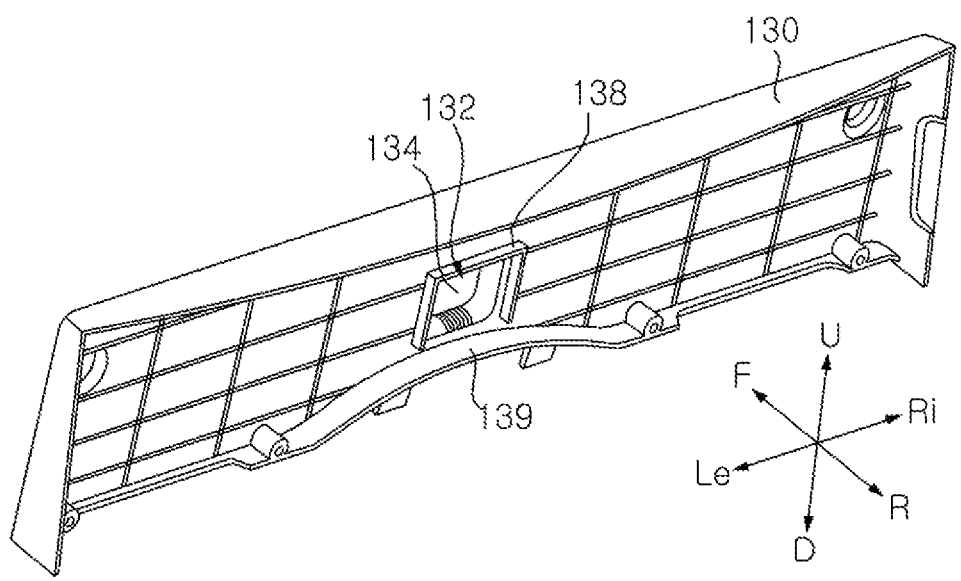
FIG. 16 is a perspective view showing an inner surface of a first rear cover according to an embodiment of the present invention.
Figure 17A:
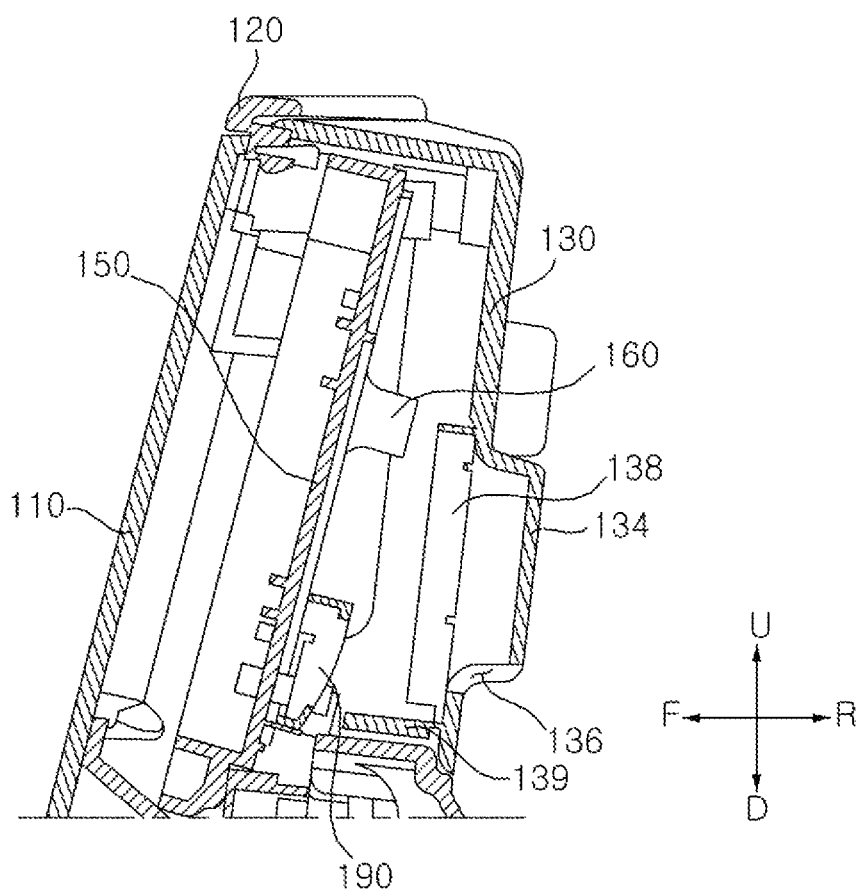
FIG. 17A to FIG. 17C are a cross-sectional view and a cross-sectional perspective view of one side of a door in which a speaker is mounted according to an embodiment of the present invention.
Figure 17B:
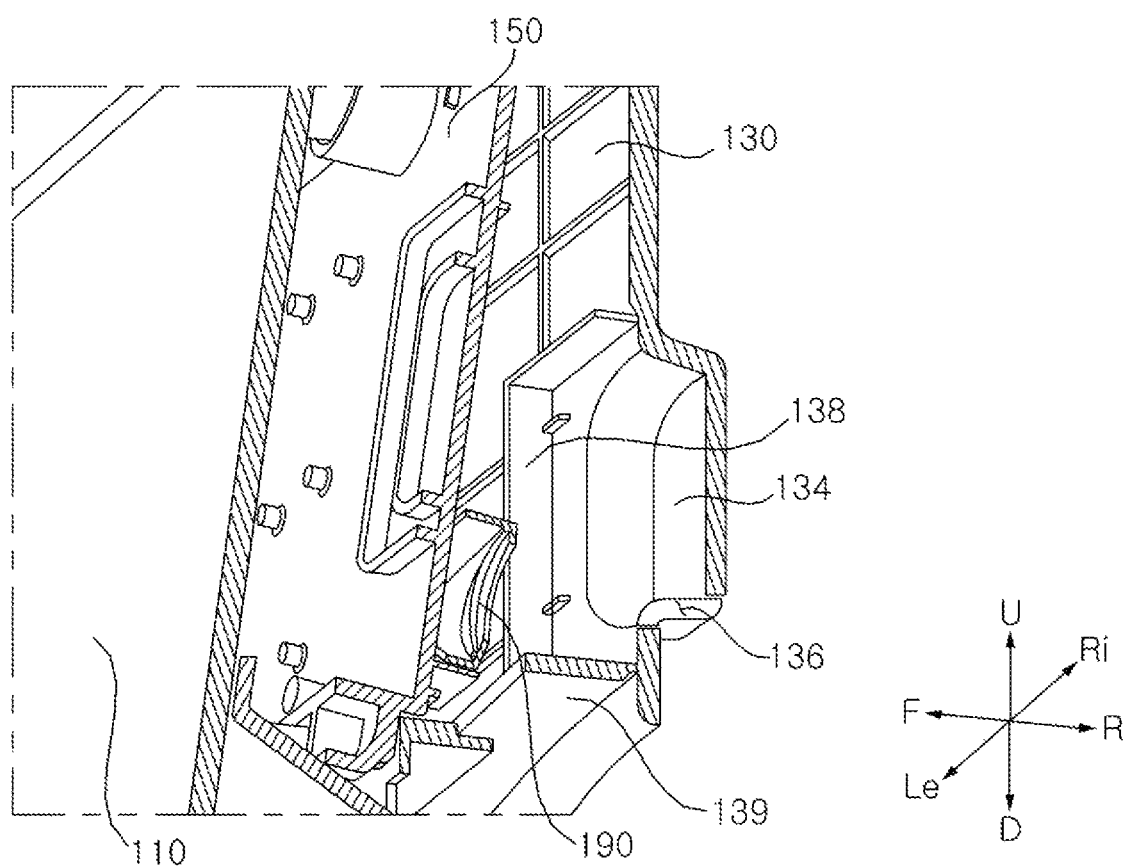
Figure 17C:
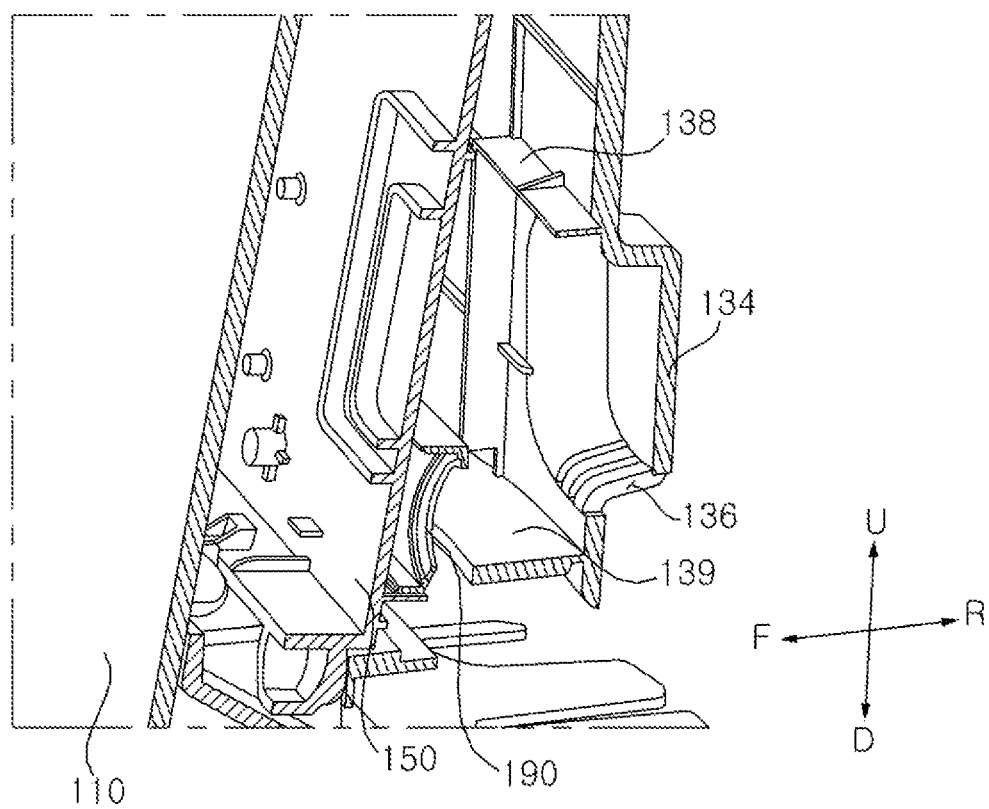
Figure 18:
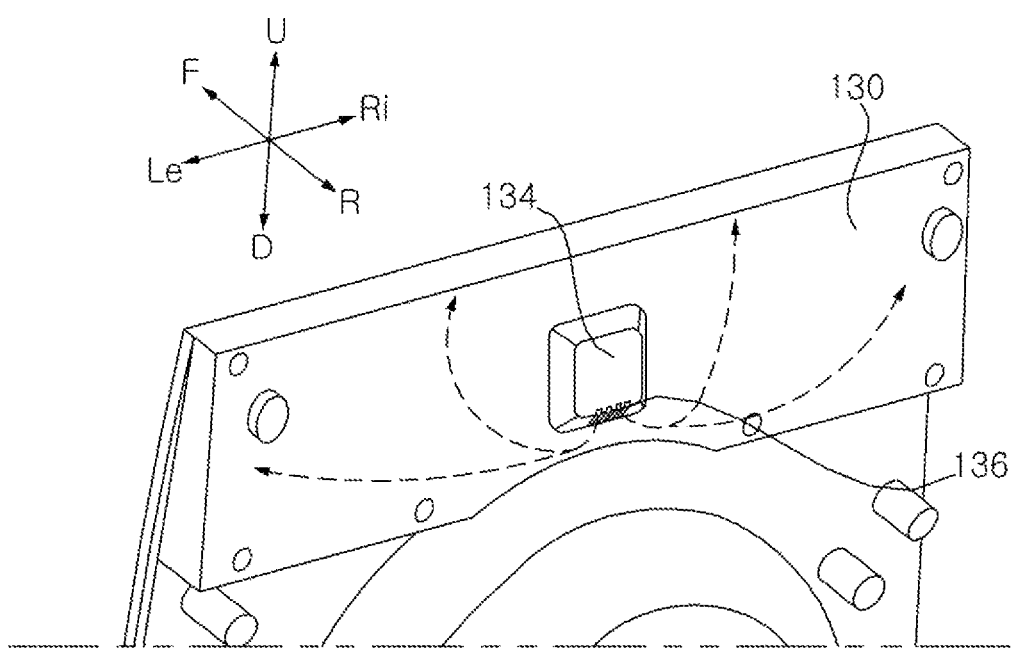
FIG. 18 is a view for explaining a path through which a sound generated in a speaker is propagated to the rear of a first rear cover.
Figure 19:
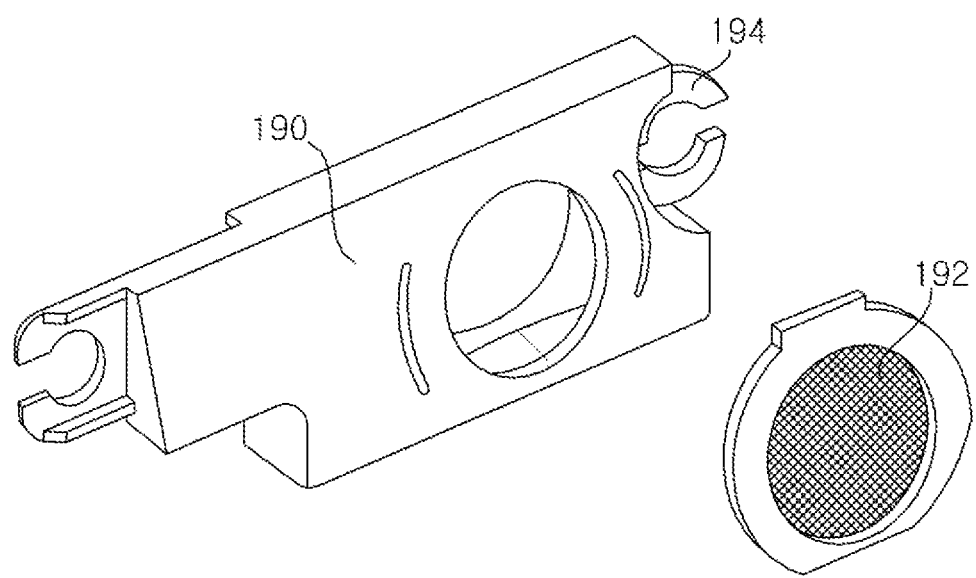
FIG. 19 is a view for explaining a speaker and a speaker water-repellent member according to an embodiment of the present invention.

FIG. 10 is an exploded view for explaining a structure in which a speaker is disposed inside a door according to an embodiment of the present invention. FIG. 11 is a front view of a speaker mounting member according to an embodiment of the present invention. FIG. 12 is an enlarged perspective view of a portion where the speaker of FIG. 11 is mounted. FIG. 13 is a bottom view of FIG. 11. FIG. 14 is a view showing a state in which a speaker is mounted in FIG. 11. FIG. 15 is a view for explaining a speaker groove part of a rear cover according to an embodiment of the present invention. FIG. 16 is a perspective view showing an inner surface of a first rear cover according to an embodiment of the present invention. FIG. 17A to FIG. 17C are a cross-sectional view and a cross-sectional perspective view of one side of a door in which a speaker is mounted according to an embodiment of the present invention. FIG. 18 is a view for explaining a path through which a sound generated in a speaker is propagated to the rear of a first rear cover. FIG. 19 is a view for explaining a speaker and a speaker water-repellent member according to an embodiment of the present invention.

First, the configuration of the door 100 according to the present embodiment will be described.

The door 100 according to the present embodiment opens and closes the input port 22 formed in the cabinet 20. The door 100 according to the present embodiment is fixed to one side of the cabinet 20 through the hinge part 50.

The door according to the present embodiment includes a door frame 120 which forms the internal structure of the door, a front cover 110 which is disposed in the front side F of the door frame, a door window 142 which is formed of a transparent material so that a user can observe the inside of the drum 40 from the outside, and a rear cover 130 and 140 which is disposed in the rear side R of the door frame 120 and covers the rear side of the door.

The inside of the door according to the present embodiment includes a control panel 32 which controls the operation of the laundry treatment machine, a microphone assembly 170 (see FIG. 5) which receives the user's voice, a speech recognition transmission module (not shown) which transmits a voice received through the microphone assembly 170 to an external server, and a speaker 190 (see FIG. 10) which informs the user of the operation state or processing information of the laundry treatment machine, or outputs a voice corresponding to the result of speech recognition.

The front cover 110 according to the present embodiment forms an outer shape of the front side of the door 100. The front cover 110 according to the present embodiment may be formed in a curved surface convex to the front side F. The front cover 110 according to the present embodiment may be formed of a light-transmitting glass material or a synthetic resin material. Inside the front cover 110, a microphone assembly mounting part 112 on which a microphone assembly is mounted is formed. The front cover 110 is provided with a microphone hole 116a, 116b for communicating a microphone of the microphone assembly with the outside.

The microphone assembly mounting part 112 according to the present embodiment is formed in a left upper end of the front cover 110 when viewed from the front side. However, this is just one embodiment, and it may be formed in the center or the upper end of right side.

Referring to FIG. 9A and FIG. 9B, one side surface of the microphone assembly 170 is closely attached to the microphone assembly mounting part 112 of the present embodiment. The microphone assembly mounting part 112 forms a flat seating surface to which the microphone assembly 170 is closely attached to the inner surface of the front cover 110. The inner surface of the front cover 110 also forms a curved surface convex to the front side F. The microphone assembly mounting part 112 is provided with a groove having a flat seating surface 114 formed thereon so that the microphone assembly 170 can be closely attached to the microphone assembly mounting part 112. The inner surface of the front cover 110 excluding the microphone assembly mounting part 112 forms a curved surface.

The front cover 110 according to the present embodiment is provided with a microphone hole 116a, 116b formed in the front side F of a portion where the microphones 180a, 180b of the microphone assembly 170 is disposed. Two microphone holes 116a and 116b according to the present embodiment are formed to correspond to the two microphones 180a and 180b included in the microphone assembly 170.

The two microphone holes 116a and 116b according to the present embodiment are disposed to be spaced apart from each other by a distance between the two microphones 180a and 180b. The microphone holes 116a and 116b according to the present embodiment are formed to be inclined downward toward the front side F. The depth H of the microphone hole 116a, 116b according to the present embodiment is formed to be larger than the diameter D of the microphone hole 116a, 116b. In detail, the depth H of the microphone hole 116a, 116b is formed to be larger than three times the diameter D of the microphone hole 116a, 116b. The microphone hole 116a, 116b formed in the above-described structure can prevent moisture and the like from being introduced into the microphone hole 116a, 116b from the outside.

The door frame 120 according to the present embodiment is fastened to the front cover 110 at the front side F, and to the rear cover 130, 140 at the rear side R. The door frame 120 according to the present embodiment may be formed of a synthetic resin material. The door frame 120 according to the present embodiment has a window hole 122, formed in a lower side, in which the door window 142 is installed, and a panel hole 124, formed in an upper side, in which the control panel 32 is installed.

The rear cover 130 and 140 according to the present embodiment may be divided into a first rear cover 130 which is fastened to an upper portion of the door frame 120 and has a speaker hole 136 formed therein, and a second rear cover 140 which is fastened to a lower portion of the door frame 120 and fastens the door window 142 to the door frame 120.

The first rear cover 130 according to the present embodiment is disposed in the rear side R of a space where the control panel 32 disposed in the upper portion of the door frame 120 is disposed. The first rear cover 130 according to the present embodiment is disposed in the upper side U of the second rear cover 140.

Referring to FIG. 16, the first rear cover 130 according to the present embodiment has a speaker groove part 132, which is formed in a portion opposite to a portion where the speaker 190 of the door frame 120 is disposed, that collects sound generated from the speaker and sends the sound to the outside.

The speaker groove part 132 includes a speaker groove 134 which forms a groove into the rear side so as to form a space in which sound generated from the speaker 190 is collected, a speaker hole 136 which is formed to communicate with the outside so that the sound collected in the speaker groove 134 is transmitted to the outside, and a protrusion rib 138, 139 which protrudes from the outer circumference of the speaker groove 134 to the inside of the door 100 so that the sound generated from the speaker 190 is transmitted to the speaker groove 134.

In the speaker groove 134 according to the present embodiment, a substantially rectangular groove protrudes rearward R. The speaker groove 134 according to the present embodiment may be formed in a height substantially equal to or higher than the speaker 190. The speaker groove 134 according to the present embodiment may be formed to be larger than the speaker 190 so as to collect the sound generated from the speaker 190.

The speaker hole 136 according to the present embodiment is formed on the lower side D of the speaker groove 134. Therefore, the sound collected in the speaker groove 134 may escape to the outside of the door 100 through the speaker hole 136 formed in the lower side D.

The protrusion rib 138, 139 according to the present embodiment includes a first protrusion rib 138 which is formed in the upper side U and the left and right sides Le-Ri along the outer circumference of the speaker groove 134, and a second protrusion rib 139 which is formed in the lower side D of the speaker groove 134. The first protrusion rib 138 protrudes from the inner surface of the first rear cover 130 toward the front side F where the speaker 190 is disposed. Among the sound generated from the speaker 190, the first protrusion rib 138 may collect the sound dispersed to the upper side U and to the left and right sides Le-Ri into the speaker groove 134.

The second protrusion rib 139 according to the present embodiment protrudes from the lower side D of the speaker groove 134 toward the front side F where the speaker 190 is disposed. The second protrusion rib 139 according to the present embodiment may protrude forward more than the first protrusion ribs 138. The speaker 190 according to the present embodiment may be disposed to be inclined to the lower side of the rear side R, and the second protrusion rib 139 may be protruded to the front side F as closely as possible to the speaker 190 so as to minimize the possibility that the sound generated by the speaker 190 is leaked to an inner space of the door 100. The second protrusion rib 139 according to the present embodiment may be protruded forward F even to a range against the direction in which the speaker 190 is oriented.

The second rear cover 140 according to the present embodiment is disposed in the lower side D of the first rear cover 130. The second rear cover 140 according to the present embodiment is fastened to the door frame 120. A rim portion of the door window 142 may be disposed between the second rear cover 140 and the door frame 120 when the second rear cover 140 is fastened to the door frame 120.

The door window 142 according to the present embodiment is disposed in the window hole 122 of the door frame 120 and may seal the input port 22 to be formed on the front surface of the cabinet 20. The door window 142 according to the present embodiment may be formed of a light-transmitting glass material or a synthetic resin material.

Microphone Assembly

Hereinafter, the structure and arrangement of the microphone assembly according to the present embodiment will be described with reference to FIGS. 5 to 9.

The microphone assembly 170 according to the present embodiment includes a microphone 180a, 180b for receiving a voice of a user, a printed circuit board 178 for processing an audio signal received by the microphone 180a, 180b into an electrical signal, and an adhesive member 176 for attaching the printed circuit board 178 to the front surface of the front cover 110. The microphone assembly 170 according to the present embodiment may further include a connector 182 which is connected to the printed circuit board 178 and is connected to a connection line (not shown) connected to the speech recognition transmission module.

In order to remove a microphone noise, a two-core ground shielding line may be applied to the connection line according to the present embodiment.

The microphone assembly 170 may have a plurality of microphones 180a and 180b to receive a voice command of the user more accurately, and the plurality of microphones 180a and 180b may be disposed at different positions. The microphone assembly 170 according to the present embodiment includes two microphones 180a and 180b for securing speech recognition performance. The two microphones 180a and 180b are spaced apart from each other by a certain distance. The microphone assembly 170 according to the present embodiment may remove noise by comparing sounds input from the two microphones 180a and 180b. The two microphones 180a and 180b according to the present embodiment may be spaced apart from each other by 70 to 100 mm.

The microphone 180a, 180b according to the present embodiment is disposed on the rear surface of the printed circuit board 178. In the printed circuit board 178 according to the present embodiment, a communication hole 179a, 179b is formed in a portion where the microphone 180a, 180b is disposed. That is, in the printed circuit board 178 according to the present embodiment, two communication holes 179a and 179b are formed in a portion where two microphones 180a and 180b are disposed. The communication hole 179a, 179b formed in the printed circuit board 178 is formed in a position corresponding to the microphone hole 116a, 116b of the front cover 110. Therefore, external user's voice may be transmitted to the microphone 180a, 180b through the microphone hole 116a, 116b of the front cover 110 and the communication hole 179a, 179b of the printed circuit board 178.

An adhesive member 176 for adhering the printed circuit board 178 to the microphone assembly mounting part 112 of the front cover 110 is disposed on the front surface of the printed circuit board 178. The printed circuit board 178 according to the present embodiment is formed in a substantially rectangular plate shape and has a flat front surface.

The adhesive member 176 according to the present embodiment may adhere the microphone assembly 170 to the inner surface of the front cover 110. The microphone assembly 170 according to the present embodiment may further include a water repellent member 174 for preventing external water or moisture from entering the microphone 180a, 180b or the printed circuit board 178.

The water repellent member 174 according to the present embodiment may be disposed between the two adhesive members 176. The adhesive member 176 according to the present embodiment may be disposed in both sides of the water-repellent member 174. The adhesive member 176 may be provided with a hole, which has the same size as the communication hole 179a, 179b, that is formed in a portion where the communication hole 179a, 179b of the printed circuit board 178 is formed. However, in the water repellent member 174, a hole is not formed in a portion where the communication hole 179a, 179b of the printed circuit board 178 is formed.

The printed circuit board 178 according to the present embodiment may be adhered to the seating surface 114 of the microphone assembly mounting part 112 of the front cover 110 by the adhesive member 176.

Speaker Mounting Member and Speaker

Hereinafter, a speaker and a speaker mounting member according to the present embodiment will be described with reference to FIGS. 10 to 19.

The door 100 according to the present embodiment may further include a speaker mounting member 150 on which the speaker 190 is mounted. The speaker mounting member 150 according to the present embodiment is formed in a plate shape and may be mounted in the door frame 120 or the first rear cover 130. The speaker mounting member 150 according to the present embodiment may be disposed in the panel hole 124 of the door frame 120. The speaker mounting member 150 according to the present embodiment is disposed in the front side F of the first rear cover 130.

A vertical rib 152 and a horizontal rib 154 may be arranged in a lattice form on the rear surface of the speaker mounting member 150 according to the present embodiment. A speaker mounting part 151, which is a portion on which the speaker 190 is mounted, is formed on the rear surface of the speaker mounting member 150 according to the present embodiment. The vertical rib 152 or the horizontal rib 154 according to the present embodiment is formed around the speaker mounting part 151. That is, the vertical rib 152 or the horizontal ribs 154 does not protrude toward the rear surface of the speaker mounting part 151, so that the speaker 190 can be stably placed on the rear surface of the speaker mounting member 150. In addition, the vertical rib 152 or the horizontal rib 154 does not protrude toward the rear surface of the speaker mounting part 151, so that the speaker 190 may be mounted on the rear surface of the speaker mounting member 150 as it is fitted to the end portion of the vertical rib 152 or the horizontal rib 154.

A speaker mounting boss 156 to which the speaker 190 is mounted may be formed in the speaker mounting member 150 according to the present embodiment. A fastening groove 194 of the speaker 190 may be fitted in the speaker mounting boss 156. The speaker mounting member 150 according to the present embodiment is provided with an erroneous assembling prevention rib 158, which prevents erroneous assembly of the speaker 190, formed on the lower side D where the speaker 190 is mounted. The erroneous assembling prevention rib 158 prevents the speaker 190 together with the speaker mounting boss 156 from being fastened in the reverse direction. In addition, the speaker mounting member 150 according to the present embodiment may further include a rib 160 for fixing the speaker mounting member 150 inside the door 100.

The speaker 190 according to the present embodiment is disposed inside the door 100 and is disposed to spread sound toward the rear side R. The speaker 190 according to the present embodiment is mounted in the speaker mounting member 150 disposed inside the door 100. The speaker 190 according to the present embodiment may be disposed to be inclined to the lower side D of the rear side R. The speaker 190 according to the present embodiment is disposed to face the second protrusion rib 139 of the first rear cover 130.

The speaker mounting member 150 according to the present embodiment may be provided with a speech recognition transmission module-mounting part 162 on which the speech recognition transmission module is mounted. The speech recognition transmission module-mounting part 162 may be formed in a portion adjacent to the microphone assembly 170 as the speech recognition transmission module-mounting part 162 is connected to the microphone assembly 170 by a connection line.

The speaker 190 according to the present embodiment may be provided with a fastening groove 194 formed to be fastened to the speaker mounting boss 156 of the speaker mounting member 150. The speaker 190 according to the present embodiment may further include a speaker water repellent member 174 for preventing water or moisture from flowing into a sound generating portion.

Use of Laundry Treatment Machine

Figure 20:
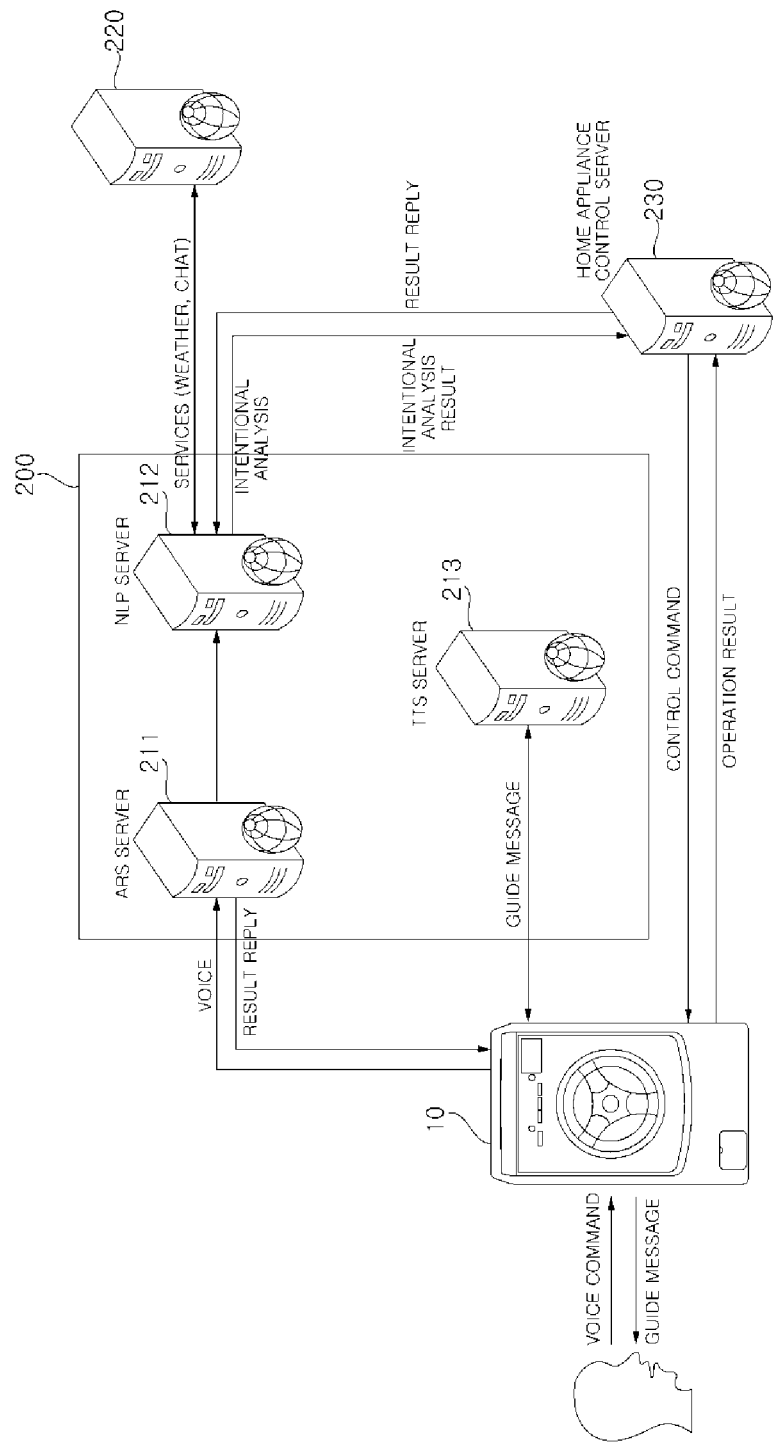
FIG. 20 is a view illustrating a laundry treatment machine, a speech recognition system, and a home appliance control server of a laundry treatment machine control system according to an embodiment of the present invention.

FIG. 20 is a view illustrating a laundry treatment machine, a speech recognition system, and a home appliance control server of a laundry treatment machine control system according to an embodiment of the present invention.

Hereinafter, referring to FIG. 20, a laundry treatment machine control system capable of accomplishing voice conversation with a user by using a laundry treatment machine including a microphone assembly, a speech recognition transmission module, and a speaker according to the present embodiment will be described.

As shown in FIG. 20, the laundry treatment machine control system may include a laundry treatment machine 10, a speech recognition system 200, a home appliance control server 230, and a service server 220 for providing required services.

The laundry treatment machine control system includes the speech recognition system 200 for receiving voice data from the laundry treatment machine 10, analyzing the voice data, and determining a voice command according to the analyzed voice data.

The speech recognition system 200 receives the voice data from the laundry treatment machine 10, converts the received voice data into text data, and analyzes the text data to determine a voice command. Further, the speech recognition system 200 may transmit a signal corresponding to the determined voice command to the home appliance control server 230 or the service server 220.

The home appliance control server 230 transmits a control signal based on a received request signal to the laundry treatment machine 10. The service server 220 determines a service corresponding to the request signal and transmits service data.

The speech recognition system 200 includes an automatic speech recognition (ASR) server 211, a natural language processing (NLP) server 212, a text to speech (TTS) server 213.

In addition, the speech recognition system 200 may further include a connection service server (not shown) for generating a request signal corresponding to a voice command and transmitting the request signal to the home appliance control server 230 or the service server 220.

The automatic speech recognition server 211, the natural language processing server 212, and the text-to-speech server 213 of the speech recognition system 200 may be implemented respectively by a single or a plurality of servers, as shown in the drawing. In addition, the automatic speech recognition server 211, the natural language processing server 212, and the text-to-speech server 213 of the speech recognition system 200 may form a single voice server.

The automatic speech recognition server 211 receives voice data from the laundry treatment machine 10 and converts the received voice data into text data.

The automatic speech recognition server 211 may perform speech recognition for the speech data received from the laundry treatment machine 10 to generate text data and transmit the generated text data to the natural language processing server 212.

The natural language processing server 212 receives the text data from the automatic speech recognition server 211, analyzes the received text data to determine a voice command, and transmits a response signal based on the determined voice command to the laundry treatment machine 10.

The natural language processing server 212 may analyze the text data received from the automatic speech recognition server 211 according to a natural language processing algorithm and determine a voice command.

The natural language processing server 212 may process a natural language that is routinely used by a person according to a natural language processing algorithm and may analyze the intent of a user. The natural language processing server 212 may perform natural language processing for the text data received from the automatic speech recognition server 211 and determine a voice command that matches the intent of a user.

The natural language processing server 212 may determine a voice command that matches the intent of a user even if the user inputs a voice command in a daily use language.

The natural language processing server 212 may transmit a signal corresponding to the natural language processing result, i.e., a signal corresponding to the determined voice command, to the home appliance control server 230 or the service server 220.

If the determined voice command is related to the laundry treatment machine 10, the natural language processing server 212 communicates with the home appliance control server 230 to perform a corresponding operation. If the voice command is not related to home appliances including the laundry treatment machine 10, the natural language processing server 212 communicates with an external service server 220 to perform a corresponding operation.

The natural language processing server 212 determines whether it is possible to support the voice command determined based on the state information of the laundry treatment machine 10, and may transmit a request signal corresponding to the determined voice command, or a signal indicating that it is an unsupported function to the home appliance control server 230.

The text-to-speech server 213 receives a signal including text corresponding to a response signal from the laundry treatment machine 10, converts the text included in the received signal into voice data, and transmits the voice data to the laundry treatment machine 10.

The laundry treatment machine 10 may receive voice command input by the user and transmit the voice data based on the received voice command input to the speech recognition system 200.

The home appliance control server 230 may transmit a control signal based on the received request signal to the laundry treatment machine 10.

For example, when a request to change a set temperature of the laundry treatment machine 10 is received, the home appliance control server 230 may transmit a control signal for changing the set temperature to the laundry treatment machine 10.

Meanwhile, the laundry treatment machine 10 may perform a corresponding operation according to the control signal received from the home appliance control server 230.

In addition, after performing the requested operation, the laundry treatment machine 10 may transmit a signal indicating that the operation is performed to the home appliance control server 230.

In addition, the home appliance control server 230 may receive a response signal for the control signal from the laundry treatment machine 10, and transmit processing result information corresponding to the response signal.

In addition, the home appliance control server 230 may transmit the operation result received from the laundry treatment machine 10 to the speech recognition system 200, and transmit a response signal including the processing result information to the laundry treatment machine 10.

The speech recognition system 200 receives a signal including an output text corresponding to the processing result information from the laundry treatment machine 10, converts the received output text into voice data, and transmits the voice data to the laundry treatment machine 10. The response signal based on the determined voice command that the natural language processing server 212 transmits to the laundry treatment machine 10 may include processing result information.

The laundry treatment machine 10 may receive a response signal based on the voice command determined by the natural language processing server 212. Here, the response signal may include text data of a response corresponding to the determined voice command.

For example, when a user inputs a voice command to change the set temperature of an air conditioner, the response signal may include text data indicating that the set temperature is changed.

Meanwhile, the laundry treatment machine 10 may transmit a signal including the text corresponding to the received response signal to the text-to-speech server 213. Here, the signal including the text corresponding to the response signal may include the output text corresponding to the processing result information.

Meanwhile, the text-to-speech server 213 converts the text included in the received signal into voice data and transmits the voice data to the laundry treatment machine 10. Here, the converted voice data may include a sound source file.

The laundry treatment machine 10 may output a voice guide message based on the received voice data through the speaker.

Meanwhile, the natural language processing server 212 may determine whether the laundry treatment machine 10 can support the voice command based on the state information of the laundry treatment machine 10 and, if it can support, may transmit a request signal corresponding to the determined voice command to the home appliance control server 230.

Further, when it is not possible to support the voice command determined based on the state information of the laundry treatment machine 10, the natural language processing server 212 may transmit a signal indicating that it is an unsupported function. A signal indicating that it is an unsupported function may be included in a response signal based on the determined voice command transmitted by the natural language processing server 212.

The laundry treatment machine 10 may request the voice data to the text-to-speech server 213, and output a voice guide message indicating that it is an unsupported function in the current state.

According to an embodiment, the home appliance control server 230 may determine whether voice command can be supported.

The laundry treatment machine control system of the present invention can be used by organically connecting servers having various roles for natural speech processing.

The laundry treatment machine 10 performs operations such as reception and preprocessing of the voice command, and transmission to server, and the speech recognition system 200 may perform a natural language processing such as voice/text conversion, intention analysis, and command identification.

As the speech recognition system 200 performs the natural language processing, the laundry treatment machine 10 may reduce the burden of the CPU, memory, etc. of the internal embedded module.

The laundry treatment machine 10 may receive voice data including a sound source file from the speech recognition system 200 and output a voice guide message as an audio so that it is possible to reply to the voice input of a user through auditory feedback.

The laundry treatment machine 10 may receive a voice file streaming from the speech recognition system 200, and reproduce and output the voice guide message to the user. Accordingly, the laundry treatment machine 10 need not store various sound source files.

The laundry treatment machine control system ensures compatibility and connectivity through a plurality of servers and utilizes the home appliance control server 230 as a final control command so that collision between home appliances control using WiFi communication and collision between the home appliance control through a portable terminal and the home appliance control by the voice input through the home appliance 300 can be prevented through the voice recognition process and the home appliance control server 230.

In addition, the laundry treatment machine control system can relieve a load concentrated on a specific server depending on a certain single server through an organic connection between the servers. In addition, since each server has a different role, when a problem occurs in a specific server, it is possible to respond easily by linking with other servers.

In addition, since a plurality of servers can be independently updated from time to time, it is advantageous for performance improvement. Total Use of Home Appliances Including Laundry Treatment Machine FIG. 21 is a schematic view of a laundry treatment machine control system according to an embodiment of the present invention.

Hereinafter, referring to FIG. 21, a control system that can be utilized in all home appliances that can be provided in the home including the laundry treatment machine 10 according to the present embodiment will be described.

Figure 21:
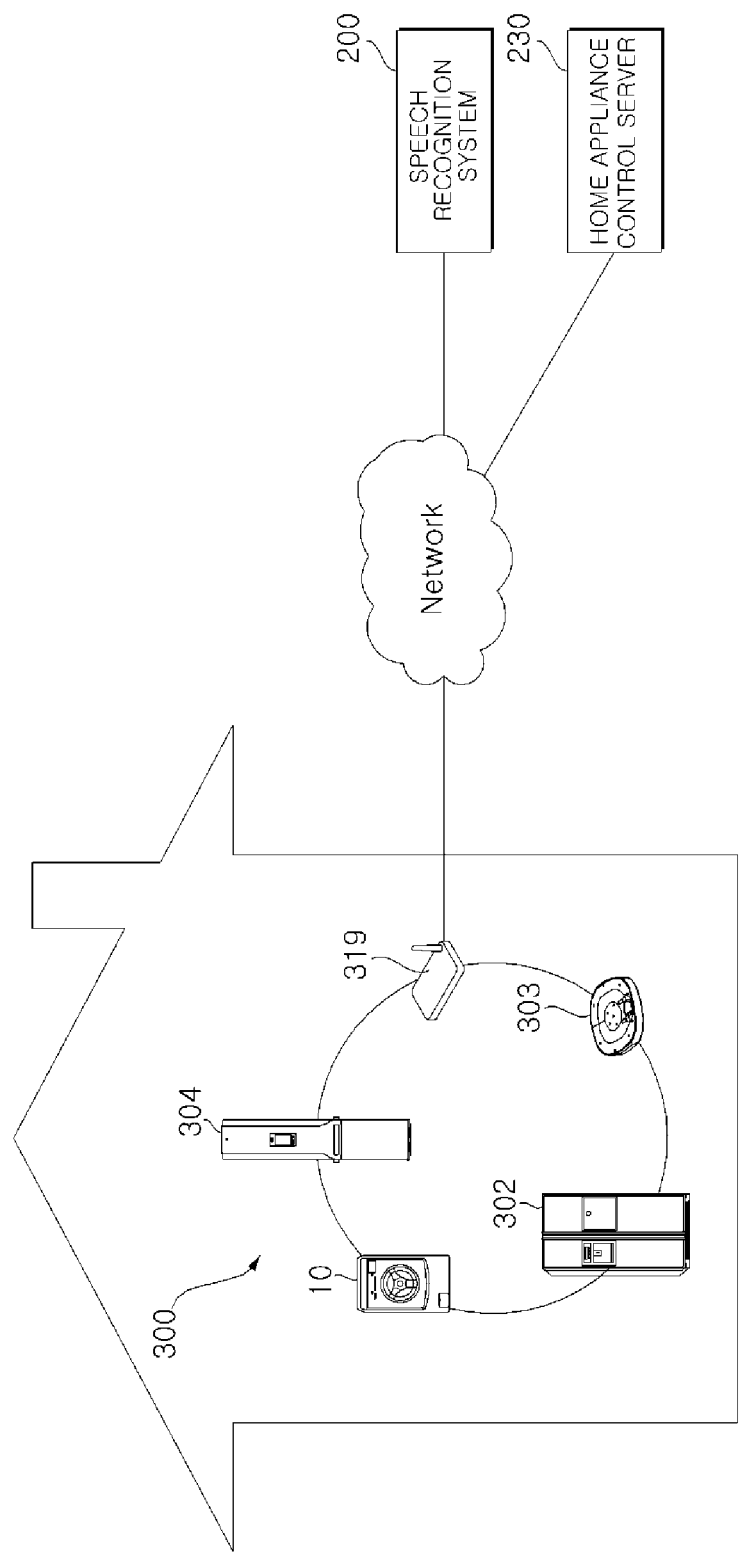
FIG. 21 is a schematic view of a laundry treatment machine control system according to an embodiment of the present invention.

Referring to FIG. 21, a laundry treatment machine control system according to an embodiment of the present invention includes a home appliance 300 which has a communication module and is capable of communicating with other device or accessing to network, a voice recognition system 200 for recognizing and processing voice, a home appliance control server 230 for controlling home appliances according to a voice recognition result.

The home appliance 300 includes a laundry treatment machine 10, an air conditioner 304, a mobile robot 303, and a refrigerator 302, and may include a TV (not shown), a cooking device (not shown), and the like.

In addition, the home appliance may include a portable terminal (not shown) such as a smart phone, a tablet PC.

The home appliance 300 may include a communication module, and the home appliances may be connected to each other to form a network. The appliance network may be connected to an external network, e.g., Internet through a communication device 219. In addition, the home appliance 300 may be connected to a network for separate speech recognition and home appliance control.

A communication device 210 may be an access point AP enabling to perform mutual data transmission and reception between home appliances and enabling each home appliance to communicate with the speech recognition system 200 and the home appliance control server 230.

The communication method of the home appliance 300 may be a Wi-Fi communication method. The Wi-Fi is just an example of a communication method, and the present invention is not limited to the communication method.

In addition, the home appliance 300 may include a different type of communication module or a plurality of communication modules. For example, a home appliance may include an NFC module, a zigbee communication module, a Bluetooth™ communication module, and the like.

The home appliance 300 may be connected to a server included in the speech recognition system 200 or a certain external server, or to user's portable terminal or the like through a wi-fi communication module or the like, and may support a smart function such as remote monitoring, remote control. The user may check the information on the home appliance 300 or control the home appliance 300 through the portable terminal.

The home appliance 300 may receive the user's voice input, the speech recognition system 200 may recognize and analyze the user's voice input, and the home appliance control server 230 may control the home appliance 300.

Meanwhile, at least some of the servers included in the speech recognition system 200 may be a server operated by a manufacturer of a home appliance, a sales company, or may be a server operated by a company entrusted with a service by a manufacturer or a sales company.

According to the laundry treatment machine of the present invention, one or more of the following effects can be obtained.

First, the laundry treatment machine according to the present invention is advantageous in that a microphone for recognizing a voice of a user is closely attached to an inner surface of a door, and the voice of user is recognized by a plurality of microphone, thereby more accurately recognizing the voice of a user.

Second, the laundry treatment machine according to the present invention is advantageous in that a sound generated from a speaker is collected into a speaker groove and then transmitted to the outside through a speaker hole, thereby transmitting a clear sound to a user.

Third, the laundry treatment machine according to the present invention is advantageous in that a water repellent member is mounted in a speaker or a microphone assembly disposed inside a door, the microphone hole is inclined downwardly toward the front side, the speaker hole is formed toward the rear side of the door, so that it is possible to prevent external moisture or water from entering and it can be used for a long period of time.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

The present invention has been made in view of the above problems, and provides a laundry treatment machine capable of accurately recognizing a user's voice.

The present invention further provides a laundry treatment machine capable of accurately transmitting sound generated from a speaker to a user.

The present invention further provides a laundry treatment machine having a structure in which moisture is not introduced into a microphone assembly and a speaker that are electrically operated.

In accordance with an aspect of the present invention, a laundry treatment machine includes: a cabinet which forms an outer shape and has an input port through which laundry is input; a tub which is disposed inside the cabinet and stores washing water; a drum which is rotatably disposed inside the tub; a microphone assembly in which a plurality of microphones for speech recognition are spaced apart; a door which opens and closes the input port, and has an inner front surface, on which the microphone assembly is disposed, to which the microphone assembly is closely attached, that comprises a microphone hole, which communicates with the outside, formed in each portion where the plurality of microphones are disposed, so that it is possible to eliminate a space where the sound leakage occurs between the microphone assembly and the door.

The microphone hole of the laundry treatment machine according to the present invention is formed to be inclined downward forward, so that external water cannot easily flow into the door.

A depth H of the microphone hole of the laundry treatment machine according to the present invention is formed to be larger than three times a diameter D of the microphone hole, so that external water cannot easily flow into the inside of the door, and external sound can be properly transmitted to the inside.

The microphone assembly of the laundry treatment machine according to the present invention has a microphone which receives user's voice; and a printed circuit board which processes an audio signal received by the microphone into an electrical signal, wherein the printed circuit board has one side which is in close contact with an inner surface of the door, and has the other side on which the microphone is disposed.

The printed circuit board of the laundry treatment machine according to the present invention has a communication hole for communicating the microphone hole formed in the front side with the microphone disposed in the rear side, so that the voice of the user can be transmitted to the microphone.

The microphone assembly of the laundry treatment machine according to the present invention comprises an adhesive member which adheres the printed circuit board to the inner front surface of the door; and a water repellent member which prevents external moisture from flowing into the printed circuit board, so that the printed circuit board can be brought into close contact with the inner front surface of the door and external moisture can be prevented from entering.

The adhesive member of the laundry treatment machine according to the present invention is disposed on both sides of the water-repellent member, and the adhesive member has a hole, which has the same size as the communication hole, formed in a portion where the communication hole of the printed circuit board is formed, so that the voice of the user can be transmitted to the microphone.

The door of the laundry treatment machine according to the present invention comprises a door frame which forms an internal structure of the door; a front cover which is disposed on the front side of the door frame, is formed in a curved surface convex to the front side, and has a flat surface, on which the microphone assembly is mounted, that is formed inside; a door window which is disposed in a rear side of the front cover and seals the input port; and a rear cover which is disposed in a rear side of the door frame and covers the rear side of the door, wherein the front cover has a groove which forms a flat seating surface in a portion where the microphone assembly is mounted, so that the microphone assembly can be brought into close contact with the front cover.

The laundry treatment machine according to the present invention further comprises a speaker which outputs a sound corresponding to an operation state of the laundry treatment machine, processing information, or speech recognition result, wherein the rear cover has a speaker groove forming a groove convex to a rear side so as to form a space for collecting the sound generated from the speaker and a speaker hole formed in a lower side of the speaker groove so as to communicate with the outside, so that the sound generated by the speaker can be collected into the speaker groove and then transmitted to the outside through the speaker hole.

The laundry treatment machine according to the present invention further comprises a speaker mounting member which is disposed in the front side of the rear cover and on which the speaker is mounted, wherein the speaker is disposed in the speaker mounting member so as to face the rear cover, so that sound can be transmitted to the rear side of the door.

In the laundry treatment machine according to the present invention, a vertical rib and a horizontal rib, which are protruded to a rear side, are disposed in a lattice shape on a rear surface of the speaker mounting member in which the speaker is mounted, wherein the vertical rib and the horizontal rib are protruded to a rear side from a portion excluding a portion where the speaker is mounted, so that it is possible to reinforce the rigidity of the speaker mounting member and to identify a portion where the speaker is mounted.

The speaker mounting member of the laundry treatment machine according to the present invention has an erroneous assembling prevention rib protruded to a rear side of the speaker mounting member so as to be in contact with a lower side separated from an upper side of the speaker, so that it is possible to prevent the reverse mounting of the speaker.

The rear cover of the laundry treatment machine according to the present invention includes a protrusion rib protruding from an outer circumference of the speaker groove to the inside of the door and the protrusion rib comprises a first protrusion rib formed in an outer circumference of an upper side and left and right sides of the speaker groove; and a second protrusion rib formed in a lower side of the speaker groove, wherein the speaker is disposed to be inclined toward the second protrusion rib, and the second protrusion rib is longer than the first protrusion rib, so that the sound generated from the speaker can be collected into the speaker groove.

The laundry treatment machine according to the present invention further comprises a speaker water repellent member for preventing moisture from flowing into the inside of the speaker.

In accordance with another aspect of the present invention, a laundry treatment machine includes: a cabinet which forms an outer shape and has an input port through which laundry is input; a tub which is disposed inside the cabinet and stores washing water; a drum which is rotatably disposed inside the tub; a speaker which outputs a sound corresponding to an operation state of the laundry treatment machine, processing information, or speech recognition result; and a door which opens and closes the input port, and has a speaker groove part that forms a space therein in which the speaker is disposed, and collects sound generated from the speaker in an inner rear surface and transmits the sound to the outside.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A laundry treatment machine comprising:
a cabinet that defines an exterior of the laundry treatment machine, the cabinet having an input port;
a tub disposed inside the cabinet;
a drum rotatably disposed inside the tub;
a microphone assembly including a plurality of microphones that are spaced apart from one another; and
a door configured to open and close the input port, and the door including a front cover having an inner surface, and the front cover having a plurality of microphone holes to communicate with outside of the door, and the microphone assembly is disposed on the inner surface of the front cover, and
wherein each of the plurality of microphone holes is to communicate with a separate corresponding one of the plurality of microphones,
wherein the microphone assembly comprises:
one of the plurality of microphones to receive a user's voice; and
a circuit board to process an audio signal, received by the one of the microphones, into an electrical signal, wherein the circuit board includes a first side and a second side, and wherein the inner surface of the front cover is on the first side of the circuit board, and the one of the microphones is on the second side of the circuit board,
wherein the circuit board has a communication hole configured to communicate with one of the plurality of microphone holes on the front cover of the door, and to communicate with the one of the microphones on the second side of the circuit board,
wherein the microphone assembly comprises:
an adhesive member configured to adhere the circuit board to the inner surface of the front cover; and
a water repellent member covering the communication hole and configured to prevent moisture from flowing to the circuit board,
wherein the adhesive member has an adhesive hole configured to communicate with the communication hole of the circuit board.

2. The laundry treatment machine of claim 1, wherein at least one of the microphone holes is inclined downward through the front cover of the door.

3. The laundry treatment machine of claim 1, wherein a depth of at least one of the microphone holes is at least three times larger than a diameter of the at least one of the microphone holes.

4. The laundry treatment machine of claim 1, wherein the adhesive member is disposed on front and rear sides of the water repellent member, and
wherein the adhesive hole has a same size as the communication hole of the circuit board.

5. The laundry treatment machine of claim 1, wherein the door comprises:
a door frame that defines an internal structure of the door;
the front cover disposed on a front side of the door frame, a portion of the front cover having a curved surface that is convex relative to the front side of the door frame, and a portion of the front cover having a flat seating surface on which the microphone assembly is to be provided;
a door window disposed at a rear of the front cover to seal the input port; and
a rear cover disposed at a rear of the door frame.

6. The laundry treatment machine of claim 5, further comprising a speaker disposed between the front cover and the rear cover,
wherein the rear cover has a speaker groove with a convex shape so as to provide a space for collecting sound from the speaker, and a speaker hole is provided at a lower side of the speaker groove to communicate with the outside of the door.

7. The laundry treatment machine of claim 6, further comprising a speaker mounting member disposed in front of the rear cover, wherein the speaker is disposed on the speaker mounting member so as to face the rear cover of the door.

8. The laundry treatment machine of claim 7, further comprising a vertical rib and a horizontal rib that protrude from a rear surface of the speaker mounting member,
- wherein the vertical rib and the horizontal rib are disposed in a lattice shape on the rear surface of the speaker mounting member,
- wherein the vertical rib and the horizontal rib protrude from a portion of the rear surface of the speaker mounting member, other than a portion where the speaker is disposed on the speaker mounting member.

9. The laundry treatment machine of claim 8, further comprising an erroneous assembling prevention rib that protrudes from the rear surface of the speaker mounting member, the erroneous assembling prevention rib to be in contact with a lower side of the speaker.

10. The laundry treatment machine of claim 7, wherein the rear cover includes a protrusion rib that protrudes from an outer circumference of the speaker groove toward an inside of the door.

11. The laundry treatment machine of claim 10, wherein the protrusion rib comprises:
- a first protrusion rib provided at an outer circumference of an upper side and left and right sides of the speaker groove; and
- a second protrusion rib provided at a lower side of the speaker groove,
- wherein the speaker is disposed to be inclined toward the second protrusion rib, and the second protrusion rib is longer than the first protrusion rib.

12. The laundry treatment machine of claim 6, further comprising a speaker water repellent member to prevent moisture from flowing to the speaker.

13. A laundry treatment machine comprising:
- a cabinet that defines an exterior of the laundry treatment machine, the cabinet having an input port;
- a tub disposed inside the cabinet;
- a drum rotatably disposed inside the tub;
- a speaker for outputting an audio corresponding to an operation state of the laundry treatment machine, processing information, or speech recognition result; and
- a door configured to open and close the input port, and the door including a space to receive the speaker,
- wherein the door comprises:
  - a front cover; and
  - a rear cover disposed at a rear of a door frame,
- wherein the speaker is disposed between the front cover and the rear cover,
  - wherein the rear cover has a speaker groove with a convex shape so as to provide a space for collecting sound from the speaker, and a speaker hole is provided at a lower side of the speaker groove to communicate with outside of the door.

14. The laundry treatment machine of claim 13, further comprising a speaker mounting member disposed in front of the rear cover, wherein the speaker is disposed on the speaker mounting member so as to face the rear cover of the door.

15. The laundry treatment machine of claim 14, further comprising a vertical rib and a horizontal rib that protrude from a rear surface of the speaker mounting member,
- wherein the vertical rib and the horizontal rib are disposed in a lattice shape on the rear surface of the speaker mounting member,
- wherein the vertical rib and the horizontal rib protrude from a portion of the rear surface of the speaker mounting member, other than a portion where the speaker is disposed on the speaker mounting member.

16. The laundry treatment machine of claim 15, further comprising an erroneous assembling prevention rib that protrudes from the rear surface of the speaker mounting member, the erroneous assembling prevention rib to be in contact with a lower side of the speaker.

17. The laundry treatment machine of claim 14, wherein the rear cover includes a protrusion rib that protrudes from an outer circumference of the speaker groove toward an inside of the door,
- wherein the protrusion rib comprises:
  - a first protrusion rib provided at an outer circumference of an upper side and left and right sides of the speaker groove; and
  - a second protrusion rib provided at a lower side of the speaker groove,
  - wherein the speaker is disposed to be inclined toward the second protrusion rib, and the second protrusion rib is longer than the first protrusion rib.

* * * * *